Jan. 25, 1955     L. S. LYNCH, JR     2,700,724
ELECTRIC FOOD HEATER
Filed Jan. 15, 1952     2 Sheets-Sheet 1
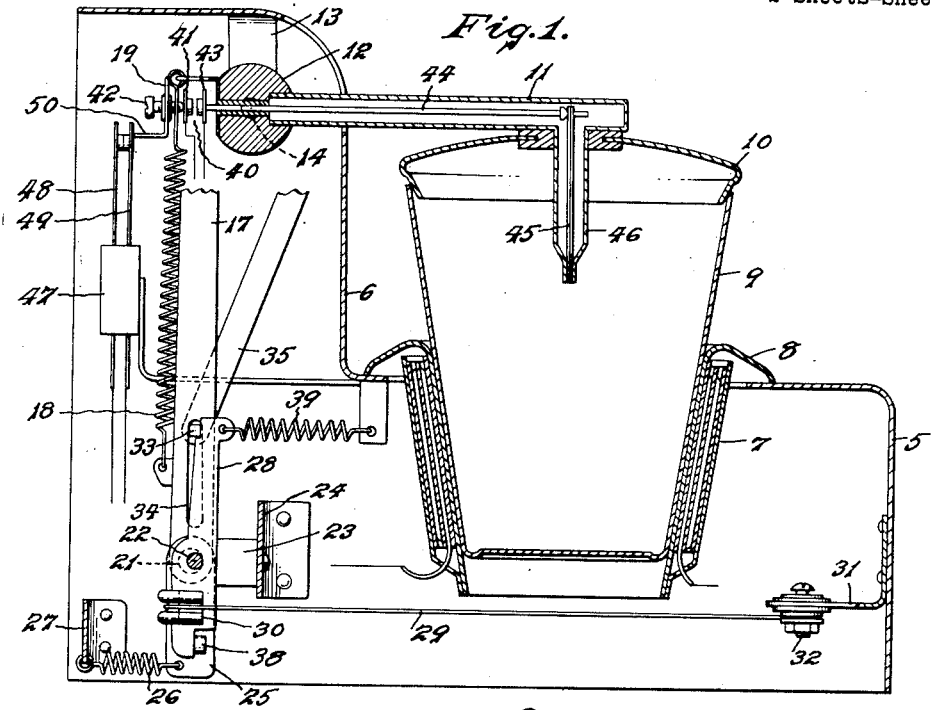
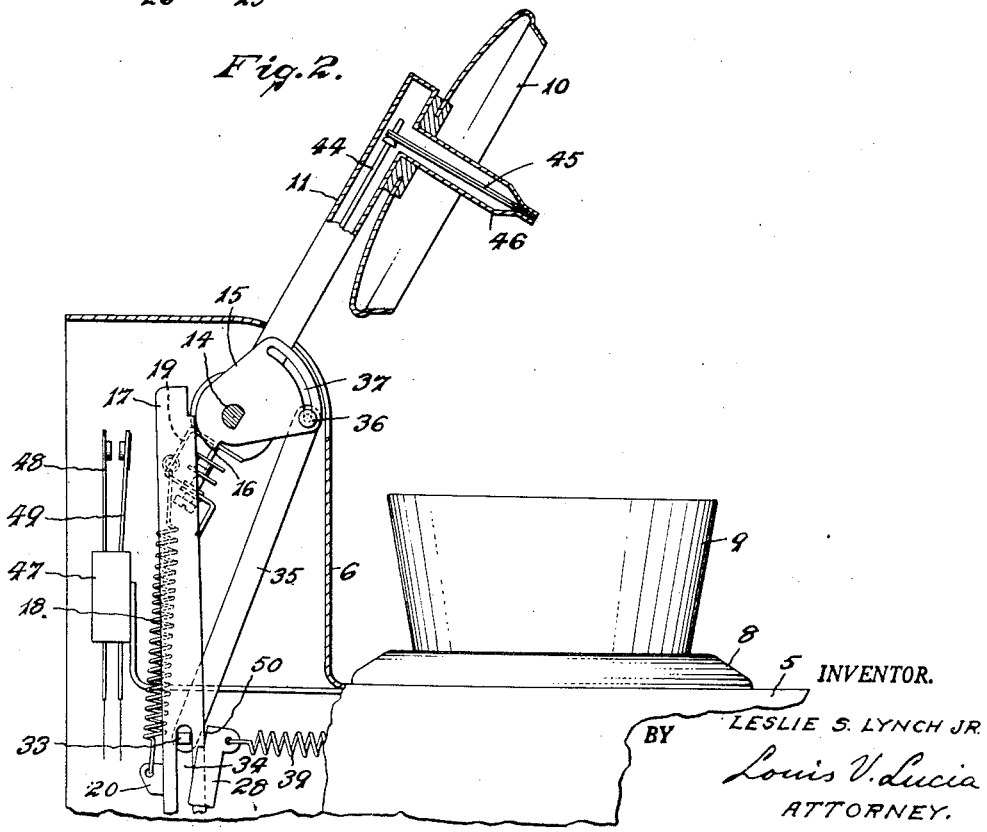
INVENTOR.
LESLIE S. LYNCH JR.
BY Louis V. Lucia
ATTORNEY.

Jan. 25, 1955　　　　　L. S. LYNCH, JR　　　　2,700,724
ELECTRIC FOOD HEATER
Filed Jan. 15, 1952　　　　　　　　　　　2 Sheets-Sheet 2
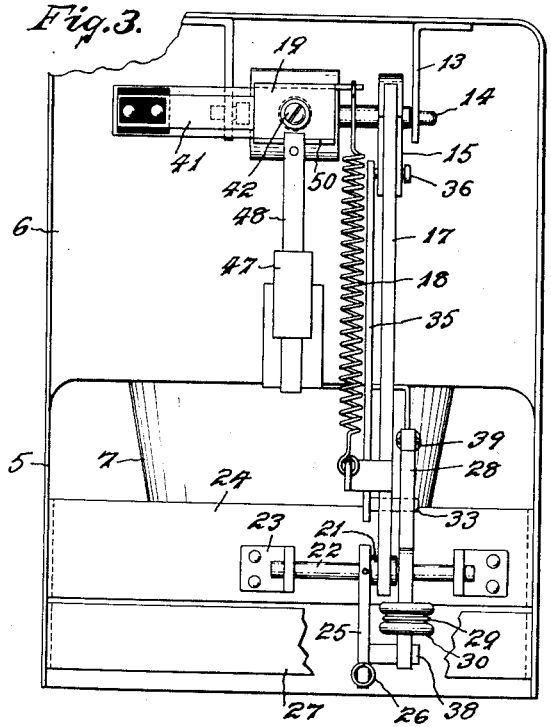
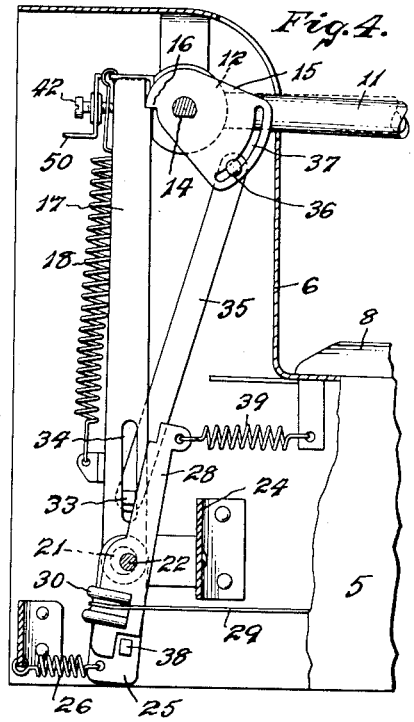
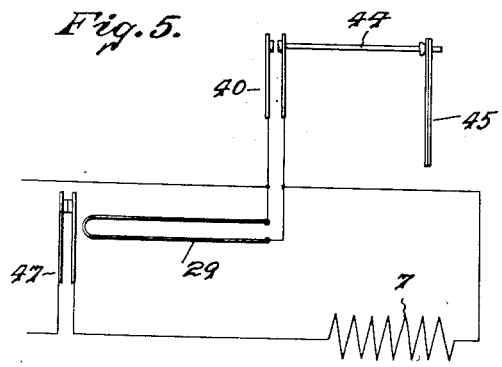
INVENTOR.
LESLIE S. LYNCH JR.
BY Louis V. Lucia
ATTORNEY.

United States Patent Office 2,700,724
Patented Jan. 25, 1955

2,700,724

ELECTRIC FOOD HEATER

Leslie S. Lynch, Jr., Bogota, N. J., assignor to Rudo Associates, Newark, N. J.

Application January 15, 1952, Serial No. 266,561

10 Claims. (Cl. 219—43)

This invention relates to an electric food heater and more particularly to a heater, such as shown and described in my copending application, Serial No. 265,948, filed January 11, 1952, and which is adapted for heating soup and other liquid or semi-liquid foods to a predetermined temperature.

It is an object of this invention to provide an improved heater that is particularly adapted for heating soups and the like in restaurants and at lunch counters.

A further object of my invention is to provide a heater having a container, in which food is heated, and an improved automatic mechanism for uncovering the container and terminating the heating operation.

A still further object of my invention is to provide such a heater having automatic means for moving the cover into contact with the container so as to compensate for any variation that may occur in the height of the container.

Further objects and advantages of this invention will be more clearly understood from the following description and the accompanying drawings in which:

Fig. 1 is a side view, in central vertical section, of a food heater embodying my invention, the electric wiring for said heater being shown partly in diagrammatic form.

Fig. 2 is a side view of said heater, partly in central vertical section, illustrating the operation of the control mechanism thereof.

Fig. 3 is a rear view of the heater.

Fig. 4 is a side view, partly broken away and further illustrating the operation of the control mechanism.

Fig. 5 is a diagrammatic view of the electrical circuit for said heater.

As illustrated in the drawings, my improved electric food heater preferably comprises a base 5 having a raised rear portion 6 for supporting parts of the operating mechanism. A heating unit 7 is supported upon the base 5 by means of a flange 8 which rests upon the top of the said base, and the said unit is adapted to receive a container 9 for the material which is to be heated in the heater.

As in the heater described in my co-pending application, the said container is provided with a cover 10 that is carried by a tubular arm 11 which has a hub 12 by means of which it is pivotally mounted in a bracket 13 on the upright portion 6 of the base.

In the mechanism of the present embodiment, the hub 12 is rigidly secured to a rocker shaft 14 to which is also rigidly secured a detent member 15 having a detent 16 which is engaged by a dogging bar 17 to retain the cover 10 in covering position upon the container 9 (as shown in Fig. 1) against the tension of a common spring 18 which normally urges the cover towards the raised position illustrated in Fig. 2 and also urges the dogging bar 17 into contact with the detent 16 for retaining the cover in its covering position; the said spring being secured to a bracket 19, which extends rearwardly from the hub 12, and at the other end to a projection 20 on the dogging bar 17.

The said dogging bar is pivotally mounted upon an eccentric portion 21 of a rocker shaft 22 which is rotatably mounted in a bracket 23 on the cross bar 24 and has, rigidly secured thereto, a lever 25 to which is attached one end of a spring 26 which is anchored to a cross bar 27 and urges rotation of the shaft 22 in a clockwise direction as viewed in Figs. 1 and 4.

An operating lever 28 is pivotally carried upon the said rocker shaft 22 and this lever is operated, in a manner to be hereinafter described, by a "hot wire" 29 which extends over an insulating member 30, on the lever 28, and is anchored to a bracket 31 by means of an insulated electrical connection 32. The said "hot wire" being a low resistance wire that is connected in the electrical circuit in series with the resistance of the heating element 7 as illustrated in Fig. 5.

The said lever 28 is operatively connected to the dogging bar 17 by means of a movable stud 33 which extends through a slot 34, in the said dogging bar, from a bar 35 that is connected to the detent member 15 by means of a pin 36 which extends through a slot 37 in the said member. The said operating lever is also engageable with a stop 38 on the lever 25 which normally positions the operating lever with relation to the dogging bar 17 and a spring 39 is provided for normally urging said operating lever in a clockwise direction against the tension of the hot wire 29.

The energization of said "hot wire" 29 is controlled by means of an electric switch 40 which is preferably carried on the bracket 19 and consists of a stationary bar 41, that is adjustable by means of an adjusting screw 42, and a movable bar 43 which is operated by a rod 44 that extends lengthwise in the arm 11 and is connected to a thermally responsive bar 45; the said bar being mounted in a tubular projection 46 which extends from the said arm, through the cover 10 and into the container 9 so as to render the said thermostatic bar responsive to temperature changes in the container.

As also shown in Fig. 5, the said normally open switch 40, when closed, by-passes the "hot wire" 29 in the electrical circuit, to thereby control the energization thereof, and a normally open main switch 47 is also provided in said circuit for controlling the heating element 7; the said main switch preferably comprising a stationary bar 48 and a movable bar 49 which is normally biased away from the stationary bar 48 and is moved into contact with said stationary bar by a projection 50 on the bracket 19.

The operation of the herein described electric heater is as follows:

The food to be heated in said heater is first placed in the container 9 and the cover 10 is then swung downwardly into covering position upon the container until the dogging bar 17 engages the detent 16 and retains the cover in said position as shown in Fig. 1. This downward movement of the cover will cause the projection 50 to engage the bar 29 and close the main switch 47; thereby energizing the heating element and also the "hot wire" 29.

As the said "hot wire" is heated, it will expand and cause the lever 28 to be rotated in a clockwise direction under the influence of the spring 39. This will move the said lever 28 away from the stop 38 and thereby permit the lever 25 to be moved in a clockwise direction and thereby cause the dogging bar 17 to be moved in an upward direction so that it will push upon the detent 16 and automatically force the cover 10 into contact with the top of the container 9, under the influence of the said spring 26, to thereby compensate for any variations in the height of the container which may occur through the use of different containers in combination with the heater or otherwise.

As the "hot wire" 29 expands and the lever 28 is moved in a clockwise direction, the stud 33 will slide down the slot 34 and follow the said lever to thereby maintain an operative connection between it and the dogging bar 17.

During the heating of the material in the container, by the heating element 7, the thermostatic bar 45 will flex and, through the rod 44, move the contact 43 toward the stationary contact 41. When the material within the container has been heated to the temperature which was predetermined by the adjustment of the said bar 41 with the screw 42, the said stationary bar will be contacted by the movable bar 43 and the switch 40 will thereupon be closed. This will by-pass the "hot wire" 29 and cause it to become de-energized. As the said wire cools, it will contact and rock the lever 28 in a contra-clockwise direction. The said lever will then, through its engagement with the stud 33, rock the dogging bar 17 against the tension of the spring 18 and cause it to release the detent 16. This will also permit the cover to be raised to uncovering position (as shown in Fig. 2) under the influence of the said spring 18.

As the arm 11 is swung upwardly to raise the cover 10, the detent member 15 will move with said arm in a contra-clockwise direction and, as the pin 36 engages the end of the slot 37, the bar 35 will be pulled upwardly and the stud 33 will thereby be raised to the top of the slot 34 as shown in Fig. 2. When the lever 28 is returned to its normal position, by the cooling of the "hot wire" 29 to its normal temperature, the said stud will rest in the notch 50 at the top of said lever which, when the cover 14 is again moved downwardly to closing position, will retain the said stud 33 in its raised position until the lever 28 is again caused to move by the heating of the "hot wire" 29 in a subsequent heating operation.

I claim:

1. An electric heater comprising a heating element, a container associated with said element, a cover for said container, an electric circuit, a "hot wire" in said circuit, means for bypassing said "hot wire" to cause de-energization and contraction thereof upon a predetermined temperature being attained within the container, and means controllable by the contraction of said "hot wire" for causing the cover to be moved away from the container.

2. An electric heater comprising a heating element, a container associated with said element, a cover for said container normally biased into uncovering position relatively thereto, a detent movable with said cover, a dogging member engageable with said detent for retaining the cover in covering position upon the container, an electric circuit, an electrical resistance wire in said circuit for operating said dogging member, a normally open electric switch for bypassing the said resistance wire in said circuit, and means responsive to temperature changes within the container for closing said electric switch to thereby bypass and cause de-energization of the said resistance wire and contraction thereof for operating the dogging member to release the detent and thereby permit movement of the cover to its uncovering position.

3. A heater comprising a heating element, a container associated with said element, a cover for said container, an electric circuit, an electrical resistance wire in said circuit, means operable upon the movement of said cover into covering position for closing the circuit and energizing the said wire, mechanism operable by the expansion of the said wire upon the heating thereof for further moving the cover into contact with the container, and means operable upon the movement of the cover to uncovering position for causing opening of said circuit.

4. An electric heater comprising a heating element, a container in which material is heated by said element, a cover for said container normally biased into uncovering position relatively thereto, a detent movable with said cover, a dogging bar engageable with said detent for retaining the cover in covering position upon the container, an electric circuit, an electrical resistance wire in said circuit, means for closing said circuit upon manual movement of the cover towards closing position relatively to the container and thereby cause energization of said resistance wire means operable upon the heating of said wire for further moving the cover into closing contact with the container, means responsive to temperature changes in said container for causing de-energization of the said resistance wire, and means operable upon the cooling of said wire for causing said dogging member to disengage the detent.

5. An electric heater comprising a base, a heating element in said base, a container associated with said heating element, an arm pivotally mounted on said base, a cover carried by said arm into covering and uncovering positions relatively to the container, means normally biasing the cover towards its uncovering position, a detent movable with said arm, a dogging bar engageable with said detent for retaining the cover into covering position, an electric circuit for energizing said heating element, an electrical resistance wire in said circuit operatively connected with the said dogging bar and adapted to cause it to disengage the detent and permit movement of the cover to its uncovering position upon the de-energization and contraction of the said wire, a normally open electric switch in said circuit operable upon the closing thereof to bypass the said wire and cause re-energization thereof, means for operating said switch and a main switch in said circuit operable upon the movement of the cover to its uncovering position for opening the said circuit.

6. An electric heater comprising a base, a heating element on said base, a container heated by said heating element, an arm pivotally mounted upon said base, a cover carried by said arm and movable into covering and uncovering positions relatively to the container, a detent movable with said arm, a rocker shaft, a dogging bar pivotally mounted upon said rocker shaft and normally biased into engagement with the detent for retaining the cover in covering position, eccentric means on said shaft normally biased for causing movement of the dogging member to further move the cover into contact with the container, an electric circuit, a resistance wire in said circuit normally retaining said eccentric means inoperative, a normally open main switch in said circuit adapted to be closed upon movement of the cover into covering position to thereby cause energization and heating of the resistance wire and permit the eccentric means to raise the dogging bar and move the cover into contact with the container, a normally open electric switch by-passing the said resistance wire, means responsive to temperature changes in the container for closing the said latter switch to cause de-energization of the resistance wire, and means operable upon the cooling of said resistance wire for causing disengagement of the dogging member from the detent.

7. An electric heater comprising a base, an electric heating element on said base, a container associated with said heating element, an arm pivotally mounted on said base, a cover carried by said arm and normally biased towards uncovering position relatively to the container, a detent movable with said arm, a rocker shaft, an eccentric on said rocker shaft, a dogging bar pivoted upon said eccentric and normally biased towards engagement with the detent for retaining the cover in covering position, a lever rotatable on said shaft, an electric circuit for said heating element, an electrical resistance wire in said circuit connected to said lever, a main switch for closing said circuit and causing energization of the heating element and the said wire, an abutment between the said lever and the rocker shaft for normally positioning the eccentric, a spring operable upon the expansion of the said wire to move the said lever and permit rotation of the eccentric for actuating the dogging bar to move the cover towards the container, connecting means between said dogging bar and lever adapted to follow the lever during the expansion of the said wire and maintain a connection between it and the dogging bar whereby the said dogging bar will be disengaged from the detent when the movement of said lever is reversed upon the contraction of the wire, a normally open switch for bi-passing the hot wire, and means responsive to temperature changes in said container for closing the latter switch and causing deenergization and contraction of the hot wire.

8. An electric heater comprising a base, an electric heating element supported by said base, a container heated by said element, an arm pivotally mounted on said base, a cover carried by said arm and normally biased towards uncovering position relatively to the container, a detent movable with said arm, a rocker shaft, a dogging bar pivoted upon said rocker shaft and normally biased towards engagement with the detent for retaining the cover in covering position, a lever pivoted on said shaft and movable relatively to the dogging bar, an electric circuit, an electrical resistance wire in said circuit connected to said lever, a switch for closing the circuit and causing energization and expansion of the said resistance wire, a spring for moving said lever in one direction upon the expansion of the resistance wire, a connecting member slidable from a normal position upon the dogging bar for following the said lever and retaining a connection between it and the dogging bar, means responsive to temperature changes within the container for causing deenergization and contraction of the resistance wire, the said lever being movable in an opposite direction upon the contraction of the resistance wire to actuate the dogging member through the said connecting member for disengaging the detent and permitting raising of the cover to uncovering position, and means connected to said connecting member for returning it to its normal position upon the said dogging bar when the cover is moved to its uncovering position.

9. An electric heater comprising a base, an electric heating element on said base, a container associated with said heating element, a shaft rotatable on said base, an arm secured to said shaft, a cover carried by said arm and movable to covering and uncovering positions relatively to the container, a detent member secured to said shaft and movable with said arm, a rocker shaft, a dogging bar pivoted on said rocker shaft and normally urged towards engagement with the detent member to retain the cover in covering position, a lever pivotally mounted on said rocker shaft, an electric circuit, an electrical resistance wire within said circuit and connected to said lever, a normally open electric switch in said circuit for controlling the energization of said resistance wire, a spring biasing said lever in one direction upon the energization and expansion of the resistance wire, a connecting member slidable on the dogging bar and adapted to follow said lever and maintain a connection between it and the dogging bar, means for operating said switch and causing de-energization and contraction of the resistance wire, the said lever being movable by the contraction of the resistance wire to move the dogging bar through the said connecting member and cause disengagement of the detent by the dogging bar and movement of the cover to its uncovering position, and a lost motion connection between the rocker arm and the connecting member for returning the connecting member to its normal position upon the dogging bar when the cover is moved to its uncovering position.

10. An electric heater as set forth in claim 9 wherein the said lost motion connection includes a bar for carrying the connecting member, an arcuate slot in the detent member, and a pin secured to the said bar and extending through the said slot.

References Cited in the file of this patent

UNITED STATES PATENTS

| | | |
|---|---|---|
| 923,839 | Henry | June 8, 1909 |
| 2,030,932 | Persons | Feb. 18, 1936 |
| 2,102,342 | Walder | Dec. 14, 1937 |
| 2,269,178 | Breneman | Jan. 6, 1942 |